United States Patent
Grigorian et al.

(10) Patent No.: US 8,454,924 B2
(45) Date of Patent: Jun. 4, 2013

(54) METHOD FOR MAKING COHESIVE ASSEMBLIES OF CARBON

(75) Inventors: Leonid Grigorian, Camarillo, CA (US); Steven Colbern, Fillmore, CA (US); Sean Imtiaz Brahim, Camarillo, CA (US)

(73) Assignees: Yazaki Corporation, Tokyo (JP); Toray Industries, Inc., Tokyo (JP)

( * ) Notice: Subject to any disclaimer, the term of this patent is extended or adjusted under 35 U.S.C. 154(b) by 0 days.

(21) Appl. No.: 13/225,353

(22) Filed: Sep. 2, 2011

(65) Prior Publication Data

US 2012/0009115 A1    Jan. 12, 2012

Related U.S. Application Data

(63) Continuation of application No. PCT/US2010/026421, filed on Mar. 5, 2010.

(60) Provisional application No. 61/158,256, filed on Mar. 6, 2009.

(51) Int. Cl.
  *C01B 31/00* (2006.01)
  *C09C 1/44* (2006.01)
  *B82Y 40/00* (2011.01)

(52) U.S. Cl.
  USPC .............................. 423/460; 23/314; 977/842

(58) Field of Classification Search
  USPC ............................... 423/460; 23/314; 977/842
  See application file for complete search history.

(56) References Cited

U.S. PATENT DOCUMENTS

| | | | | |
|---|---|---|---|---|
| 6,139,919 | A | * | 10/2000 | Eklund et al. ............... 427/430.1 |
| 6,783,746 | B1 | * | 8/2004 | Zhang et al. ................ 423/447.1 |
| 6,972,056 | B1 | | 12/2005 | Delzeit et al. |
| 7,794,840 | B2 | | 9/2010 | Grigorian et al. |
| 7,938,987 | B2 | * | 5/2011 | Grigorian et al. ............. 252/502 |
| 8,124,419 | B2 | | 2/2012 | Brahim et al. |
| 2002/0159944 | A1 | | 10/2002 | Smalley et al. |
| 2005/0258737 | A1 | | 11/2005 | Shin |

OTHER PUBLICATIONS

Mackeyev, et al., The purifcation of HiPco SWCNTs with liquid bromine at room temperature, Carbon 2007; 45: 1013-1017.*
International Search Report for PCT/US2010/026421 mailed Oct. 20, 2010.

* cited by examiner

*Primary Examiner* — Daniel C McCracken
(74) *Attorney, Agent, or Firm* — Perkins Coie LLP; Viola T. Kung

(57) ABSTRACT

Cohesive assemblies comprising carbon are prepared by obtaining carbon in the form of powder, particles, flakes, or loose agglomerates, dispersing the carbon in a liquid halogen by mechanical mixing and/or sonication, and substantially removing the liquid halogen, typically by evaporation, whereby the cohesive assembly of carbon is formed. The method is especially suitable for preparing free-standing, monolithic assemblies of carbon nanotubes in the form of films, wafers, or discs, having high carbon packing density and low electrical resistivity. The assemblies have various potential applications, such as electrodes in batteries or supercapacitors or as electromagnetic interference shielding materials.

20 Claims, 9 Drawing Sheets

METHOD FOR MAKING COHESIVE ASSEMBLIES OF CARBON

This application is a continuation of PCT/US2010/026421, filed Mar. 5, 2010; which claims the priority of U.S. Provisional Application Nos. 61/158,256, filed Mar. 6, 2009. The contents of the above-identified applications are incorporated herein by reference in their entirety.

TECHNICAL FIELD

This invention relates to methods for preparing cohesive assemblies comprising carbon, in which the starting materials, under certain prescribed conditions, self-assemble into a disc, wafer, film, or object of a desired shape. In preferred embodiments, the carbon assemblies prepared by the method of the invention comprise carbon nanotubes. The assemblies prepared thusly show high carbon packing density and low electrical resistivity, and have various potential applications such as in electrical power storage and electromagnetic interference shielding.

BACKGROUND

Assemblies of carbon, derived from a variety of carbon sources, have a multitude of current and anticipated commercial, industrial, and high-technology applications. For example, activated charcoal or activated carbon, which is usually in the form of loose powder, particles, or irregular agglomerates, has a variety of uses in filtration and catalyst support. This material has also recently been explored for energy storage applications, as an ionic exchange medium or supercapacitor electrode material. Graphite in its various forms has numerous uses, for example, as refractory material, in brake linings, and as electrodes in electric arc furnaces. Intercalated graphite and expanded graphite have been studied for use as fire retardants and high temperature applications. These carbon assemblies have many desirable properties such as resistance to chemical attack, resistance to high temperatures, and high surface area in the case of activated carbon, and electrical conductivity and lubricity in the case of graphite. However, these materials typically require a binder or matrix material to form them into a cohesive assembly of a desired shape and size, having good mechanical strength and integrity.

More recently, assemblies of carbon nanotubes (CNTs) in various forms have attracted much attention and are being explored and developed for diverse applications. Such assemblies have been referred to in the literature as "buckypaper" or "buckydiscs". For example, Dharap et al in "Nanotube film based on single-wall carbon nanotubes for strain sensing", *Nanotechnology* 15 (2004), pp. 379-382, investigate the use of isotropic films of randomly oriented CNTs as mechanical strain sensors. Cao et al, in "Random networks and aligned arrays of single-walled carbon nanotubes for electronic device applications," *Nano Research* 1, 4 (2008), pp. 259-272, discuss the use of random networks or aligned arrays of CNTs as thin-film transistors. Ma et al, in "Methods of making carbide and oxycarbide containing catalysts," U.S. Pat. No. 7,576,027 B2, disclose catalyst supports for fluid phase chemical reactions made from randomly entangled CNT aggregates. And Liu et al, in "Electrochemical capacitor with carbon nanotubes," U.S. Patent Application Publication US 2009/0116171 A1, disclose electrolytic capacitors having electrodes made from free-standing CNT films.

While the potential applications are manifold for cohesive assemblies of carbon, and more particularly those of carbon nanotubes, several methods for producing such assemblies have also been investigated. However, these methods typically involve complex processes involving chemical modification of CNTs, reactions with hazardous gases at high temperatures, application of high pressures, use of highly corrosive materials, or other techniques that are either costly or difficult to scale up for manufacturing use.

For example, Smalley et al in "Method for producing self-assembled objects comprising single-wall carbon nanotubes and compositions thereof," U.S. Pat. No. 7,048,999 B2, disclose CNT assemblies formed by a complex process of CNT end-cap removal and derivatization. Tohji et al in "Carbon nanotubes aggregate, method for forming same, and biocompatible material," U.S. Patent Application Publication US 2007/0209093 A1, disclose a method for CNT aggregate formation involving exposure to fluorine gas followed by sintering at high temperature and pressure.

Liu et al in US 2009/0116171 A1, and Hata et al in "Aligned carbon nanotube bulk aggregates, process for production of the same and uses thereof," U.S. Patent Application Publication US 2009/0272935 A1, disclose methods for preparing CNT assemblies that require the use of CNT forests grown by CVD processes on a substrate. These methods involve a sequence of solvent washing, pressing, and/or drying steps and are limited to the scale of the starting CNT forest. Furthermore, these assemblies are characterized by a predominant orientation or alignment of the CNTs, which imparts the assembly with anisotropic and largely unidirectional properties.

Whitby et al in "Geometric control and tuneable pore size distribution of buckypaper and bucky discs," *Carbon* 46 (2008) pp. 949-956, disclose a frit compression method for forming CNT assemblies, which also requires high pressures. Also, the CNTs are not uniformly distributed within the assemblies, and the assemblies have large macropores and very high porosity (>80%).

Lastly, a method to form a solution of single-walled CNTs in sulfuric super-acids is disclosed by Davis et al in "Phase Behavior and Rheology of SWNTs in Superacids," *Macromolecules* 37 (2004) pp. 154-160. A method is also disclosed to produce an entangled mat of CNT ropes by quenching in ether and filtering.

In summary, there exists a need for an improved method to prepare cohesive assemblies of carbon having good mechanical strength and integrity, and in particular carbon nanotubes, in a simple manner that allows the preparation of assemblies in desired shapes, and is scalable both in terms of the size of the individual assembly and for manufacturing quantities of assemblies. The present invention fulfills this need and provides further related advantages.

SUMMARY OF THE INVENTION

This invention is directed to a method for preparing a cohesive assembly comprising carbon, comprising the steps of: obtaining carbon in the form of powder, particles, flakes, or loose agglomerates, dispersing the carbon into a liquid halogen, and substantially removing the liquid halogen, whereby the cohesive assembly of carbon is formed.

The carbon used to prepare the cohesive assemblies of the present invention may comprise carbon nanotubes, graphite, expanded graphite, amorphous carbon, or a combination thereof. The liquid halogen may comprise bromine, iodine, chlorine, fluorine, an interhalogen compound, or a combination thereof. In preferred embodiments, the carbon comprises single-walled carbon nanotubes, double-walled carbon nanotubes, multi-walled carbon nanotubes, or a combination thereof, and the liquid halogen comprises bromine, iodine, or a combination thereof.

The carbon is dispersed in the liquid halogen through standard known methods such as mechanical mixing, sonication, microfluidization, or a combination thereof. The liquid halogen is removed by slow evaporation, in a manner that will not prevent or disturb the formation of the cohesive assembly. In preferred embodiments, the liquid halogen is removed by evaporation at atmospheric pressure or under a vacuum, either with or without accompanying heating.

Cohesive assemblies of carbon prepared by the method of the invention may feature high effective carbon packing density, typically at least 0.5 g/cm$^3$, or at least 1.0 g/cm$^3$, and under certain conditions, at least 1.5 g/cm$^3$. Cohesive assemblies prepared by the method of the invention also feature low bulk electrical resistivity, typically lower than $10^{-1}$ Ω-cm, and under certain conditions, lower than $5\times10^{-4}$ Ω-cm. The cohesive carbon assemblies have various potential applications such as in electrical power storage and electromagnetic interference shielding.

DETAILED DESCRIPTION OF THE INVENTION

Figure 1:
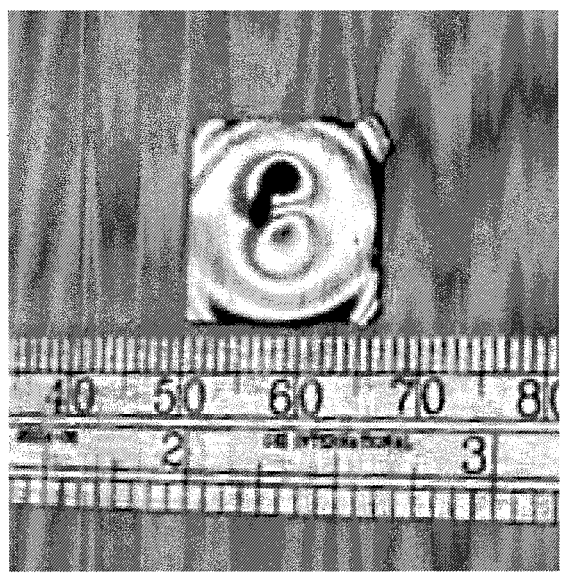
FIG. 1 is an optical image of a cohesive assembly comprising double-walled carbon nanotubes (DWCNTs) prepared according to Example 1.

The present invention is directed to a method for preparing cohesive assemblies comprising carbon. The carbon, which is initially in the form of powder, particles, flakes, or loose agglomerates, self-assembles through the method of the invention into a cohesive assembly comprising carbon. A cohesive assembly is defined herein as a monolithic structure with a distinct shape and size that is free-standing. The cohesive assembly is further defined in that it does not adhere to any other material or surface, has sufficient mechanical strength and integrity that it does not require mechanical support by any other material, and can be moved from place to place while retaining its structure, shape, and size.

A cohesive assembly can be prepared by the method of the invention into a desired shape and size by selecting an appropriate vessel for the formation of the assembly, or by cutting, filing, or otherwise mechanically shaping the assembly in an appropriate manner after its formation. The cohesive assemblies may be rigid, if they are sufficiently thick, or flexible, if they are sufficiently thin. Cohesive rigid assemblies may be referred to as wafers or discs, while cohesive flexible assemblies may be referred to as films. The assemblies are free-standing, but for the purposes of certain applications, may be placed on a substrate material, such as an electrical contact. For certain applications, flexible cohesive assemblies may be placed on a substrate for additional mechanical support. The substrate material may be glass, ceramic, metal, semiconductor, polymer, or another cohesive carbon assembly, and may also be rigid or flexible.

The cohesive carbon assemblies prepared by the method of the invention are also characterized by the substantial absence of surfactants during the preparation and in the final product. Surfactants are typically used to disperse carbon, and more specifically, carbon nanotubes, in a liquid, and in known methods of preparing carbon assemblies, surfactants are usually present as a residue. Examples of such surfactants include but are not limited to cetyl trimethylammonium bromide (CTAB), dodecylbenzenesulfonic acid sodium salt (NaDDBS), sodium cholate, sodium dodecyl sulphate (SDS), polyoxyethylene (10) octylphenol (Triton X-100) and poly (ethylene oxide) (20) sorbitan mono-oleate (Tween 80). "Substantial absence of surfactants" is defined that less than 10%, preferably less than 1%, and more preferably less than 0.1% (w/w) of surfactants relative to the weight of carbon used to prepare the assembly is present.

The cohesive carbon assemblies prepared by the method of the invention, when prepared using CNTs as the carbon source, feature high effective carbon packing density compared to other known CNT assemblies. The assemblies typically have effective CNT packing density of at least 0.5 g/cm$^3$, often have densities higher than 1.0 g/cm$^3$, and have shown densities as high as 1.5 g/cm$^3$. This high density imparts these assemblies with good mechanical strength and integrity. This high density also contributes to their superior electrical properties; in particular their low resistivity compared to other known CNT assemblies.

To determine the effective CNT packing density in a CNT-derived carbon assembly, first the apparent density of the assemblies is determined by carefully measuring the weight of the assembly using a standard analytical balance, then measuring the dimensions of the assembly using a digital micrometer or optical or scanning electron microscope, then calculating the volume of the sample from the dimensions, and dividing the weight by the volume. This calculation provides the apparent density of the assembly. Alternatively, the apparent density may be determined using a density balance and Archimedes' principle. Then, using one of various methods such as energy dispersive x-ray spectroscopy (EDS), neutron activation analysis (NAA), or thermogravimetric analysis (TGA), the weight fraction of carbon (i.e., CNTs) in the assembly can be determined. Finally, the effective packing density of CNTs is calculated by multiplying the apparent density by the weight fraction of carbon in the assembly.

The assemblies can be produced in a desired size or shape, which is determined by the amount of carbon used to prepare the assembly, and by the size and shape of the container in which the carbon assembly is prepared. This may allow the assemblies to be used in various applications requiring carbon assemblies of various shapes and sizes. When the liquid halogen is removed from the dispersion, the carbon assembly typically self-assembles in the shape and size of the bottom of the vessel in the horizontal plane, with a vertical, i.e., perpendicular thickness that is determined by the amount of carbon used and the size of the container. Greater amounts of carbon will produce a thicker wafer or disc-like cohesive assembly, while less carbon will produce a thinner, film-like assembly. Decreasing or increasing the diameter or cross-sectional area of the container used to prepare the assembly has similar effects on assembly thickness.

The carbon assemblies prepared by the method of the invention also feature low electrical resistivity compared to other carbon assemblies. These assemblies typically have resistivity lower than $10^{-1}$ Ω-cm, often have resistivity lower than $5 \times 10^{-3}$ Ω-cm, and have shown resistivity below $5 \times 10^{-4}$ Ω-cm. This low electrical resistivity along with mechanical strength and integrity may allow various applications of these assemblies, for example, as electrodes for batteries or supercapacitors, or as electromagnetic interference (EMI) shielding materials. This low resistivity is related to the high effective carbon packing density of the assemblies in that as this density increases, empty space between individual carbon entities such as nanotubes, tube bundles, or graphite platelets decreases, and the area of contact between these carbon entities increases. This naturally leads to more efficient and higher current flow through the assembly, thereby decreasing its resistivity.

Resistivity of the cohesive assemblies is determined as follows: Each sample is mounted in a sample mount, and two electrical contact pairs (two current carrying and two voltage sensing) are directly compressed to the sample, in a standard Kelvin-type (4-point) probe configuration, in a sealed and evacuated chamber. The chamber has temperature control capability, so that the resistivity at a chosen temperature or over a range of temperatures can be determined. Resistance of a sample is determined from the slope of the current-voltage (I-V) line at a chosen temperature. The geometry of the sample and the resistance value enable calculation of the material's resistivity using the formula $$\rho = R \frac{A}{L}$$

where ρ is the resistivity in Ω-cm, R is the resistance in Ω, A is the cross sectional area of the test sample in $cm^2$, and L is the length of the sample in cm. Dimensions of the samples are determined using a profilometer, digital micrometer, optical microscope and metrology software, scanning electron microscope, or other standard method.

The method for preparing a cohesive assembly comprising carbon as described above comprises the steps of (1) obtaining carbon in the form of powder, particles, flakes, or loose agglomerates; (2) dispersing the carbon uniformly into a liquid halogen, and (3) substantially removing the liquid halogen, whereby the cohesive assembly is formed.

The carbon used to prepare the cohesive assembly may comprise carbon nanotubes (CNTs), graphite, expanded graphite, amorphous carbon, or a combination thereof. Carbon nanotubes may comprise single-walled carbon nanotubes (SWCNT), double-walled carbon nanotubes (DWCNT), multi-walled carbon nanotubes (MWCNT), or a combination thereof. In one preferred embodiment of the invention, the carbon comprises double-walled carbon nanotubes. In another preferred embodiment, the carbon comprises single-walled carbon nanotubes. In another embodiment, the carbon comprises multi-walled carbon nanotubes. In yet another embodiment, the carbon comprises expanded graphite.

In step (1), the carbon used to prepare the cohesive assembly is obtained in the form of powder, particles, flakes, or loose agglomerates, that is, appropriate forms that can be dispersed in the liquid halogen. Carbon not originally in an appropriate form may be ground, pulverized, or mechanically altered in a variety of standard techniques, in order to obtain carbon in an appropriate form for the method of this invention. For example, carbon nanotubes may be purchased from a commercial source, such as single-walled carbon nanotubes available from Thomas Swan and Co., Ltd (Consett, County Durham, United Kingdom) under the product name "Elicarb SW". This material is supplied in the form of wetcake (loose agglomerates in an aqueous mixture) or as dry particles. The dry particles, which are typically smaller than 5 mm in the largest dimension, may be used as-received in the invented method. Alternatively, they may be ground into smaller particles or powder and then used in the invented method. The wetcake material may be dried by any standard method, then mechanically broken apart into particles or loose agglomerates, and then used in the invented method, or further ground into smaller particles or powder, and then used. Generally speaking, the powder, particles, flakes, or loose agglomerates of carbon used in the invented method are smaller than 1 cm in the largest dimension, preferably smaller than 3 mm in the largest dimension, and more preferably smaller than 1 mm in the largest dimension.

The liquid halogen used in the present method may comprise chlorine ($Cl_2$), bromine (Br), iodine ($I_2$), an interhalogen compound, or a combination thereof. An interhalogen compound refers to a compound having two or more different halogens, e.g., IBr, $ICl_3$, and BrF3. In a preferred embodiment of the invention, the halogen comprises bromine. In another embodiment, the halogen comprises iodine.

In step (2), the carbon is dispersed in the liquid halogen, in a prescribed ratio. A prescribed ratio of carbon to liquid halogen is defined as a ratio that will result in dispersion of the carbon in the liquid halogen, and in the formation of the cohesive assembly when the halogen is removed. For a particular type of carbon, or combination of carbon, there is a range of prescribed ratios that are determined experimentally. Within that range of prescribed ratios, that type or combination of carbon will disperse in the liquid halogen and can form a cohesive assembly when the halogen is removed.

If the ratios of the carbon and halogen amounts are outside the range of prescribed ratios for that particular type of carbon, a cohesive carbon assembly will not form. For example, if the ratio of carbon to liquid halogen is too high, the carbon may not disperse completely in the liquid halogen, but rather remain as powder, particles, flakes, or loose agglomerates, which may appear floating or suspended in the liquid halogen, or settle to the bottom of the liquid halogen in the container. If the ratio of carbon to liquid halogen is too low, the carbon may disperse completely. It may then form into an assembly during removal of the liquid halogen, but then break into pieces at the end of the process. Or, the dispersed carbon may assemble into particles or flakes, but not into a monolithic cohesive assembly. Or, the dispersed carbon may simply remain as a residue of powder, particles, flakes, or loose agglomerates in the container when the liquid halogen is removed.

In one embodiment, the prescribed ratio of carbon to liquid halogen is between 0.1 and 100 milligrams (mg) per milliliter (ml) of liquid halogen. In a preferred embodiment, the carbon comprising DWCNTs is dispersed in the liquid halogen comprising bromine in a prescribed ratio of between 1 and 40 mg, more preferably between 5 and 20 mg, and most preferably between 8 and 15 mg of DWCNTs per ml of bromine. In another preferred embodiment, the carbon comprising SWCNTs is dispersed in the liquid halogen comprising bromine in a ratio of between 1 and 40 mg, more preferably between 2 and 15 mg, and most preferably between 4 and 8 mg of SWCNTs per ml of bromine.

Dispersion of the carbon in the liquid halogen in step (2) may be carried out at or above the melting temperature of the halogen, and below the temperature at which the halogen boils. For example, if the liquid halogen is bromine, dispersion may be carried out between the bromine melting temperature of about −7.2° C. and the bromine boiling temperature of about 58.8° C. In a preferred embodiment, the carbon is dispersed in the liquid halogen comprising bromine at a temperature between 0° C. and 50° C., and more preferably between 10° C. and 30° C. Ambient room temperature (about 20° C.) is typically appropriate for dispersion of carbon in bromine. In another embodiment, the carbon is dispersed in the liquid halogen comprising iodine at a temperature between the melting temperature of iodine (about 113.7° C.) and the boiling temperature of iodine (about 184.3° C.), preferably between about 130° C. and 170° C.

Dispersing, in the method of the present invention, is defined as forming a stable suspension of the carbon in the liquid halogen. A stable suspension is one in which no visible carbon powder, particles, flakes, or loose agglomerates precipitate out of the liquid halogen or settle to the bottom of the mixture when no mechanical agitation is applied. Typically, to disperse the carbon in the liquid halogen, the carbon is first combined with the liquid halogen in a container to form a mixture, and then the mixture is mechanically agitated by one or more standard methods that can include stirring, sonication, microfluidization, etc. This agitation, along with an innate tendency of the halogen to interact with the carbon, causes the individual carbon powders, particles, flakes, or loose agglomerates to divide or break apart into successively smaller constituents and disperse, or become suspended, in the liquid.

For each particular type of carbon or combination thereof, there is a maximum ratio of carbon to liquid halogen from which stable suspension can be prepared during the dispersing step. This maximum ratio, which can be determined experimentally, is the maximum prescribed ratio for that carbon type or combination of types. Above this ratio, the liquid halogen will become saturated with dispersed carbon with additional carbon remaining undispersed. This undispersed carbon will precipitate out of the liquid halogen or settle to the bottom of the mixture when agitation is stopped.

In a preferred embodiment, the carbon comprising DWCNTs is dispersed in the liquid halogen comprising bromine by simple stirring, using any standard method such as a magnetic stirring plate with a magnetic stir bar placed in the container with the carbon and liquid halogen. In another preferred embodiment, the carbon comprising SWCNTs, DWCNTs, MWCNTs, or a combination thereof, is dispersed in the liquid halogen comprising bromine by simple stirring, followed by sonication, i.e. the application of high-intensity acoustic energy. Sonication may be carried out by a variety of methods using commercially available equipment, such as an ultrasonic processor with a probe or wand, or an ultrasonic bath or tank.

The dispersion of carbon in the liquid halogen in step (2) is distinct from common known methods of carbon dispersion, and in particular, CNT dispersion, in that no surfactant chemicals are needed to disperse the carbon. Typically, ionic surfactants such as cetyl trimethylammonium bromide (CTAB), dodecylbenzenesulfonic acid sodium salt (NaDDBS), sodium cholate, and sodium dodecyl sulphate (SDS), or nonionic surfactants such as polyoxyethylene (10) octylphenol (Triton X-100, Dow Chemical Co.) and poly(ethylene oxide) (20) sorbitan mono-oleate (Tween 80, ICI Americas, Inc.) are needed to effectively disperse CNTs in a liquid medium such as an aqueous-based solution or an organic solvent. These surfactants, when used to disperse CNTs, may remain as a residue and thereby degrade the electrical or mechanical properties of the final CNT-derived product. The cohesive assembly prepared by the present method contains no surfactants. Therefore, the method of the current invention represents a substantial improvement over existing techniques for dispersing CNTs in a liquid medium.

In step (3) of the invented method, the liquid halogen of the dispersion is substantially removed, i.e. greater than 99% of the free liquid halogen is removed, whereby the cohesive assembly of carbon is formed. During the halogen removal, the dispersed carbon self-assembles into the cohesive assembly of carbon. Any process to remove the liquid halogen that results in the formation of a cohesive assembly of carbon is within the scope of this invention.

Typically, the removal of liquid halogen is conducted by slow evaporation. During the initial stages of this evaporation, the dispersed carbon first nucleates on the top surface of the liquid halogen, and then begins to assemble or coalesce into "islands" of carbon on the surface of the liquid. As evaporation progresses, the islands grow and join together to form larger islands, eventually joining into a single monolithic disc, wafer, or film, i.e., a cohesive assembly of carbon.

If the liquid halogen is evaporated too quickly, typically a cohesive assembly of carbon will not form. In such instances, the carbon may not nucleate on the top surface of the liquid, but may instead remain as a powder or particle residue in the container. Or, the carbon may nucleate on the surface, and islands may begin to form, but they will not coalesce into a monolithic cohesive assembly, and remain as randomly-shaped agglomerates of carbon rather than a cohesive assembly. Or, the islands may coalesce into a monolith, but then later break apart into smaller pieces.

The specific conditions for evaporation of liquid halogen that will result in the formation of a cohesive assembly of carbon depend on the type of carbon and halogen, and can be determined experimentally. In one embodiment of the present invention, the liquid halogen is removed in a closed system at a pressure below atmospheric pressure. In another embodiment, the liquid halogen is removed by evaporation at atmospheric pressure. Either condition may be accompanied by heating to accelerate the evaporation of the liquid halogen, provided that the rate of evaporation is controlled such that formation of the cohesive assembly of carbon is not disturbed or prevented.

In a preferred embodiment, the liquid halogen comprising bromine is removed by evaporation at a pressure between atmospheric pressure (about 760 Torr) and 0.01 Torr, more preferably between about 1 Torr and 0.1 Torr, while heating the dispersion of carbon in liquid halogen at a temperature between room temperature (about 20° C.) and 180° C., more preferably between about 40° C. and 80° C. In another embodiment, the liquid halogen comprising iodine is removed by evaporation at a pressure between atmospheric pressure and 0.01 Torr, more preferably between 1 Torr and 0.1 Torr, while heating the dispersion of carbon in liquid halogen at a temperature between about 60° C. and 200° C., more preferably between about 100° C. and 140° C.

Typically, greater than 99% of the free liquid halogen is removed by evaporation. Any remaining free liquid halogen may optionally be removed after evaporation, by rinsing the cohesive assembly with an organic solvent such as ethanol or isopropanol and then drying either at room temperature or with mild heating in an oven.

The cohesive assembly formed by the method of the invention may be removed from the container manually or by lightly rinsing the inner surfaces of the vessel with a fluid such as a dilute acid or organic solvent. The product assembly may then receive a final drying at atmospheric pressure or under vacuum, which may be accompanied by mild heating.

Halogen remaining in the cohesive assembly after removal of all free liquid halogen is bound to the carbon in the assembly, by either a chemical or physical bonding mechanism. For example, in the case of a cohesive assembly comprising CNTs, the residual halogen may be present on the interior surfaces of the CNTs, on the exterior surfaces of the CNTs, or both on the interior and on the exterior surfaces of the CNTs. The cohesive assembly formed by the present method typically comprises between about 1% and about 60% w/w halogens. Some or all of the bonded halogens can be removed from the assembly by additional heating, which results in a cohesive assembly comprising either only carbon or carbon and only a small amount (for example, about 1 to 10% w/w) of halogen.

The method of this invention is illustrated further by the following examples that are not to be construed as limiting the invention in scope to the specific procedures or products described therein.

EXAMPLES

Example 1

Cohesive Assembly of DWCNTs

A cohesive assembly of carbon comprising CNTs was formed from double-walled carbon nanotubes (DWCNTs) in the form of a rigid wafer. The DWCNTs were obtained from Toray Industries Inc., Tokyo, Japan, having been produced according to the method of PCT Patent Application WO2008/102746A1.

About 70 mg of DWCNTs were placed in a 50-ml, 3-necked, round-bottomed Pyrex flask equipped with a heating mantle and thermocouple. The flask was connected to a vacuum system through a liquid nitrogen vapor trap. The flask was evacuated to a pressure below 1 Torr. The DWCNTs were heated at 150° C. for about 20 minutes under vacuum to remove volatile species. The flask was then cooled to room temperature (about 20° C.), and filled with nitrogen gas to atmospheric pressure. A 50-ml addition funnel was attached to the flask, and a magnetic stir bar was added to the flask.

Five ml of bromine ($Br_2$, ACS reagent, $\geq 99.5\%$, Sigma Aldrich Company, catalog number 277576) were then placed in the addition funnel, and then added to the DWCNTs in the flask. The funnel was then stoppered, the flask was positioned directly over a magnetic stirring plate, and the mixture was stirred using the magnetic stir bar and stirring plate for 16 hours (hr). Then, the flask containing the mixture was placed in a water bath at room temperature, and sonicated for 15 minutes using an ultrasonic processor (Model VCX 750, Sonics and Materials Inc., Newtown, Conn.), positioned in the water bath in close proximity to the flask. At this stage, the DWCNTs were completely dispersed and suspended in the liquid bromine.

The mixture was then transferred to a flat-bottom glass vial, with about 5 $cm^2$ bottom surface area. The vial and mixture were then placed into a larger cylindrical glass vessel with a removable top equipped with both a vacuum pickup and a condenser with a removable liquid collection flask. The top of the apparatus was then sealed with silicone vacuum grease and Teflon tape, and the entire apparatus was thermally insulated with glass wool.

The apparatus was quickly evacuated (for 10 seconds) to remove most of the air, and then slowly heated to 180° C. over a 4 hr period. Bromine thereby evaporated from the sample was collected in the collection flask that was maintained at room temperature. After the temperature reached 180° C., the apparatus was naturally cooled to 100° C. in about 20 minutes. The apparatus was then evacuated, and any remaining evaporating bromine was condensed into a liquid nitrogen trap. The apparatus was cooled to room temperature while under vacuum within about 1 hour. Finally, the vial containing the sample was removed from the apparatus, and the resulting cohesive assembly was carefully removed from the bottom.

The cohesive assembly thus obtained was in the form of a thin rigid wafer, comprising DWCNTs and residual bromine, which did not adhere to the flask. The product was washed five times with 50-ml portions of absolute ethanol ($C_2H_5OH$, >99.5%, Sigma Aldrich Company, catalog number 459844), to remove residual bromine from the outer walls of the DWCNTs. The washed wafer was then dried at room temperature under vacuum.

Figure 2:
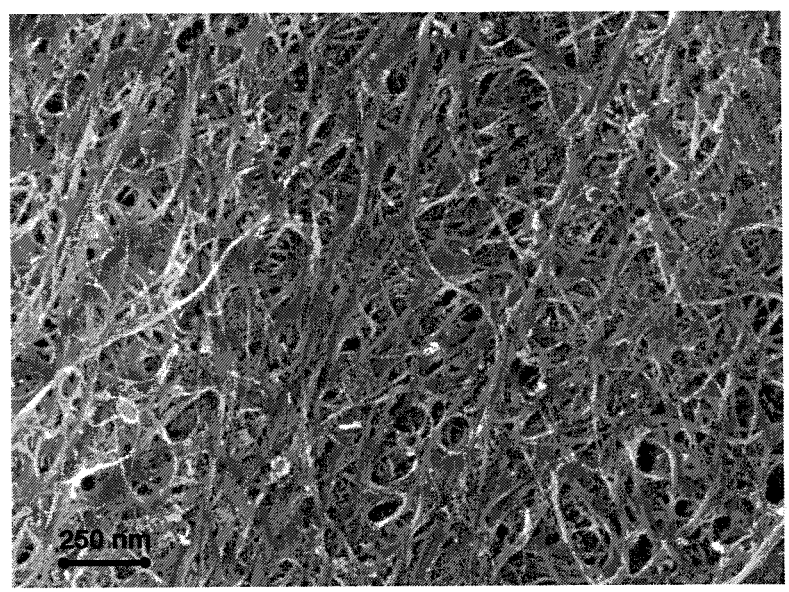
FIG. 2 is a scanning electron microscope image of a cohesive assembly comprising DWCNTs prepared according to Example 1.

The wafer was shiny and reflective on the surface facing the bottom of the flask (FIG. 1), and had a matte black appearance on the surface facing away from the bottom of the flask. The rigid wafer had good mechanical strength and integrity and could be handled easily without damaging it. The wafer contained about 30 wt % bromine, as determined by thermogravimetric analysis (TGA7, PerkinElmer Corporation, Waltham, Mass.). As shown by scanning electron microscope imaging (JSM-7500F, JEOL Corporation, Tokyo), the dense assembly consisted of CNTs overlaying one another in largely random orientation in the plane of the wafer (FIG. 2).

The wafer was about 45 μm thick as determined by a profilometer (Dektak 3030, Veeco Instruments, Plainview, N.Y.), and had a bulk density of 2.2 $g/cm^3$ as determined by simple size and weight measurement, corresponding to a DWCNT effective packing density of about 1.5 $g/cm^3$ (bromine mass subtracted).

Example 2

Cohesive Flexible Film Assembly of DWCNTs

A cohesive assembly of CNTs was formed from double-walled carbon nanotubes (DWCNTs) in the form of a flexible film.

100 mg of Toray DWCNTs were placed into a 100 ml, 3-neck flask, equipped with a heating mantle, thermocouple, vacuum system, and liquid nitrogen vapor trap. The DWCNTs were then heated under vacuum at 150° C. for 20 min to remove volatile species. The apparatus was cooled to room temperature, and a magnetic stir bar and a 50-ml addition funnel added to the flask. Ten ml of bromine were then added to the addition funnel, and then added to the flask, to cover the degassed DWCNTs.

The mixture of DWCNTs and bromine was then stirred using the magnetic stir bar and stirring plate for 20 hr at room temperature, forming a dispersion of DWCNTs in bromine. The mixture was then poured into a Petri dish containing a large quartz microscope slide. The flask was rinsed briefly with 5 ml additional bromine, to rinse out any remaining DWCNTs, and the rinse was poured into the Petri dish.

The Petri dish was then placed into a Teflon dish, and the assembly placed inside a large, glass vacuum desiccator, which had been pre-heated to 50° C. The desiccator was covered and evacuated. Bromine was then collected in a liquid nitrogen-cooled cold trap, while maintaining the desiccator at 50° C.

A thin, gray-colored flexible film was left behind on the Petri dish and microscope slide, comprising DWCNTs and residual bromine. The film was 4.0 μm thick, and resembled standard magnetic recording tape in visible appearance and texture. The film did not adhere to the bottom of the Petri dish or the microscope slide, had good mechanical integrity, and could be removed and handled easily without damaging it. The electrical resistivity of the film at a temperature of 300K was $2.7 \times 10^{-4}$ Ω-cm.

Example 3

Cohesive Flexible Wafer Assembly of DWCNTs

A cohesive flexible wafer of CNTs was formed from double-walled carbon nanotubes (DWCNTs).

About 50 mg of Toray DWCNTs were placed into a 50 ml round-bottom flask and a magnetic stir bar was added. Five ml of bromine were then added to the flask to completely cover the DWCNTs. The mixture of DWCNTs and bromine was then stirred magnetically for 6 hr at room temperature, forming a dispersion of DWCNTs in bromine.

The mixture was then transferred into a flat-bottom glass vial, with bottom surface area of about 8 cm$^2$. The vial with the mixture was then placed into a larger cylindrical glass vessel with a flat bottom and a removable top. This vessel was equipped with both a vacuum pickup and a water-cooled condenser with a removable liquid collection flask. The vessel was housed within a heating mantle, and the entire apparatus was thermally insulated with glass wool. Then, the vessel was heated to about 60° C.

Bromine thereby evaporated from the mixture was collected in the collection flask that was maintained at room temperature. Evaporated bromine was collected for about 45 minutes while maintaining the pressure of the vessel between about 0.5 Torr and 1.0 Torr. The vacuum was then shut off and the apparatus was cooled to room temperature within about 1 hour. Finally, the vial was removed from the apparatus, and the resulting cohesive assembly of DWCNTs in the vial was carefully removed from the bottom.

Figure 3:
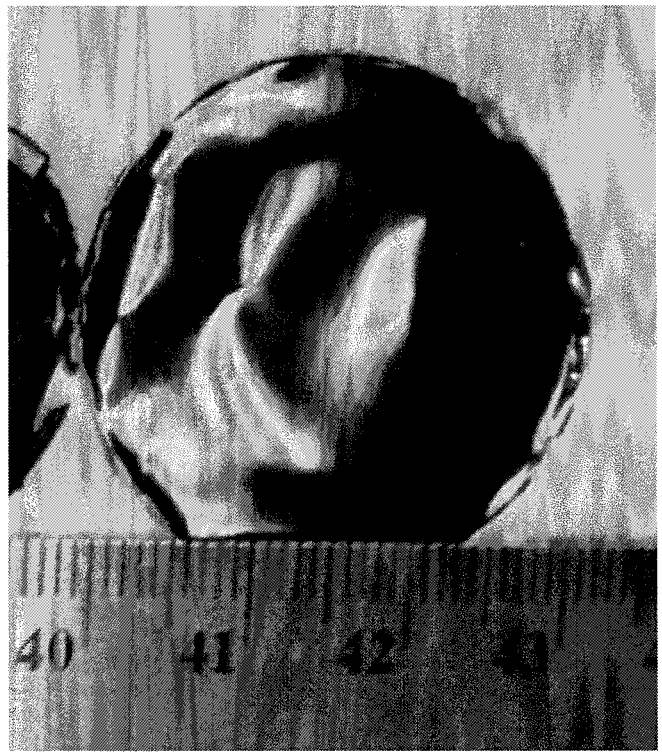
FIG. 3 is an optical image of a cohesive assembly comprising DWCNTs prepared according to Example 3.

The cohesive assembly thus obtained was in the form of a circular disc, comprising DWCNTs and residual bromine as a self-assembled wafer, which did not adhere to the flask. The wafer was shiny and reflective on the bottom surface (facing the flask) (FIG. 3), and had a matte black appearance on the top surface (facing away from the flask). The wafer had good mechanical strength and integrity and could be handled easily without damaging it.

Figure 4:
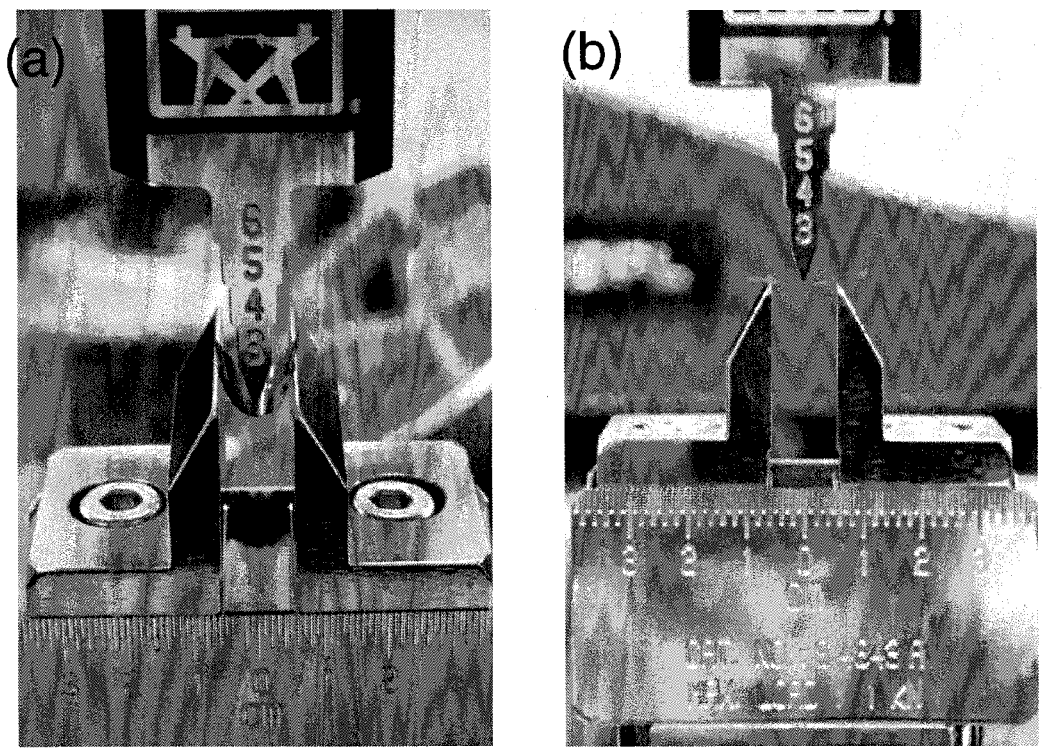
FIG. 4 (a) is an optical image of a flexural test on a rectangular sample cut from a cohesive assembly of DWCNTs prepared as in Example 3; (b) is an optical image of the same rectangular sample after the flexural test.

Strips about 4 mm in width and 10 mm in length were cut from the wafer and tested under flexure using a mechanical testing machine (Model 5565, Instron Corporation, Norwood, Mass.). The strip samples exhibited high flexibility under load without permanently deforming, and returned to near original shape after removal of the load (FIG. 4). The estimated elastic modulus was about 245 MPa.

The wafer was about 120 μm thick as determined by a digital micrometer (Fowler Sylvac, Switzerland), and had an effective carbon packing density of 0.65 g/cm$^3$.

Example 4

Large Cohesive Flexible Film Assembly of DWCNTs

A large cohesive flexible film comprising CNTs was formed from DWCNTs.

About 250 mg of Toray DWCNTs were placed into a 50 ml round-bottom flask and a magnetic stir bar was added. Twenty ml of bromine were then added to the flask to completely cover the DWCNTs. The mixture of DWCNTs and bromine was then stirred magnetically for 6 hr at room temperature (20° C.), forming a dispersion of DWCNTs in bromine.

The mixture was then transferred into a Petri dish having a bottom surface area of about 64 cm$^2$ (about 9 cm in diameter). The Petri dish and mixture were then placed into a larger cylindrical glass vessel with a flat bottom and a removable top. This vessel was equipped with both a vacuum pickup and a water-cooled condenser with a removable liquid collection flask. The vessel was housed within a heating mantle, and the entire apparatus was thermally insulated with glass wool. Then, the vessel was heated to about 60° C.

Bromine thereby evaporated from the mixture was collected in the collection flask that was maintained at room temperature. Evaporated bromine was collected for at least 1 hour while maintaining the pressure of the vessel between about 0.5 Torr and 1.0 Torr. The vacuum was then shut off and the apparatus was cooled to room temperature within about 1 hour. Finally, the Petri dish was removed from the apparatus, and the resulting cohesive assembly of DWCNTs in the dish was carefully removed from the bottom.

Figure 5:
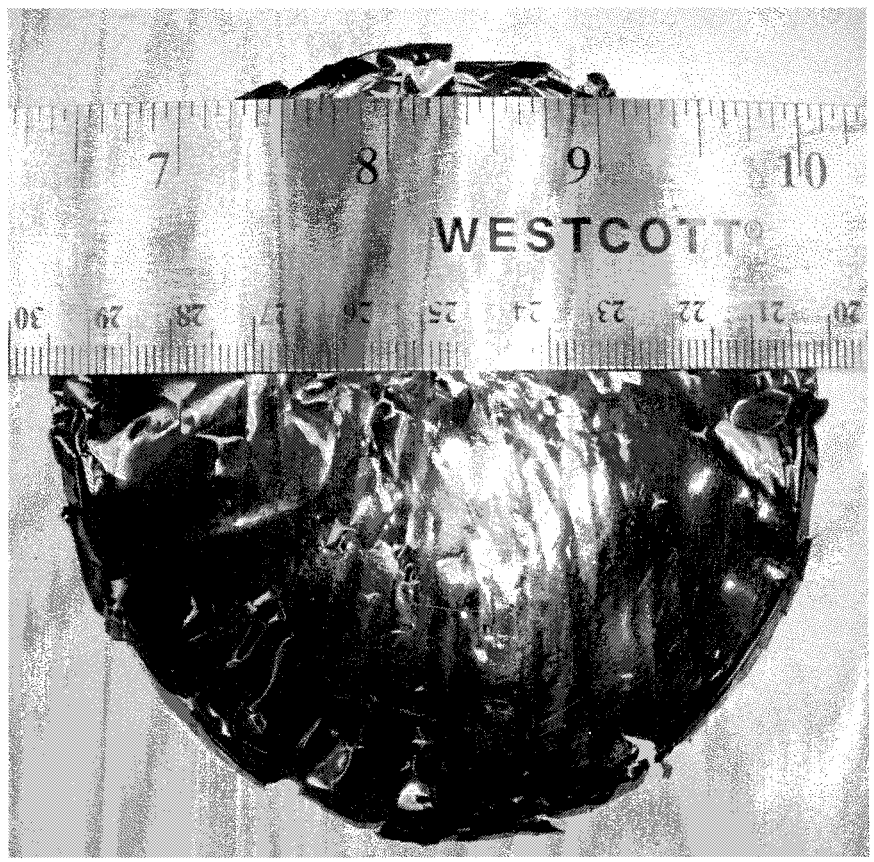
FIG. 5 is an optical image of a large (9.0 cm diameter) cohesive assembly comprising DWCNTs prepared according to Example 4.

The cohesive assembly thus obtained was in the form of a disc 9.0 cm in diameter, comprising DWCNTs and residual bromine as a flexible film, which did not adhere to the flask. The film was shiny and reflective on the surface facing the flask (FIG. 5), and matte black on the top side. The thickness of the film was about 110 μm.

Example 5

Cohesive Film Assembly of SWCNTs

A cohesive assembly comprising CNTs was formed from single-walled carbon nanotubes (SWCNTs). The SWCNTs were of a high-purity grade obtained from Carbon Solutions, Inc. (Riverside, Calif.), as product number P3.2-SWNT.

The CNT assembly was formed following the procedure described in Example 1, through the final ethanol washing and oven drying steps.

The resultant assembly was a black-colored disc comprising SWCNTs and residual bromine, about 40 μm in thickness. The disc had good mechanical integrity, and did not adhere to the bottom surface of the flask.

Example 6

Cohesive Assembly of SWCNTs

A cohesive assembly of CNTs was formed from single-walled carbon nanotubes (SWCNTs). The SWCNTs were of a high-purity grade obtained from Thomas Swan & Co. Ltd. (Consett, County Durham, United Kingdom), with product name Elicarb SW (catalog number PR0925).

About 50 mg of SWCNTs were placed into a 50 ml round-bottom flask and a magnetic stir bar added. Five ml of bromine were then added to the flask to completely cover the SWCNTs. The mixture of SWCNTs and bromine was then stirred magnetically for 24 hr at room temperature. The mixture was then transferred to a Teflon centrifuge tube (50 ml capacity) that had a flexible copper sheath wrapped around it. The mixture was sonicated in the tube for 10 minutes by directly applying an ultrasonic processor probe tip, operating at 50% amplitude, to the sheathed tube. After sonication, the SWCNTs were uniformly dispersed in the liquid bromine. The viscosity of the mixture after sonication was markedly increased.

The mixture was then transferred to a flat-bottom glass vial, with about 8 cm² bottom surface area, and bromine was then removed by slow evaporation in a similar manner as in Example 3.

Figure 6:
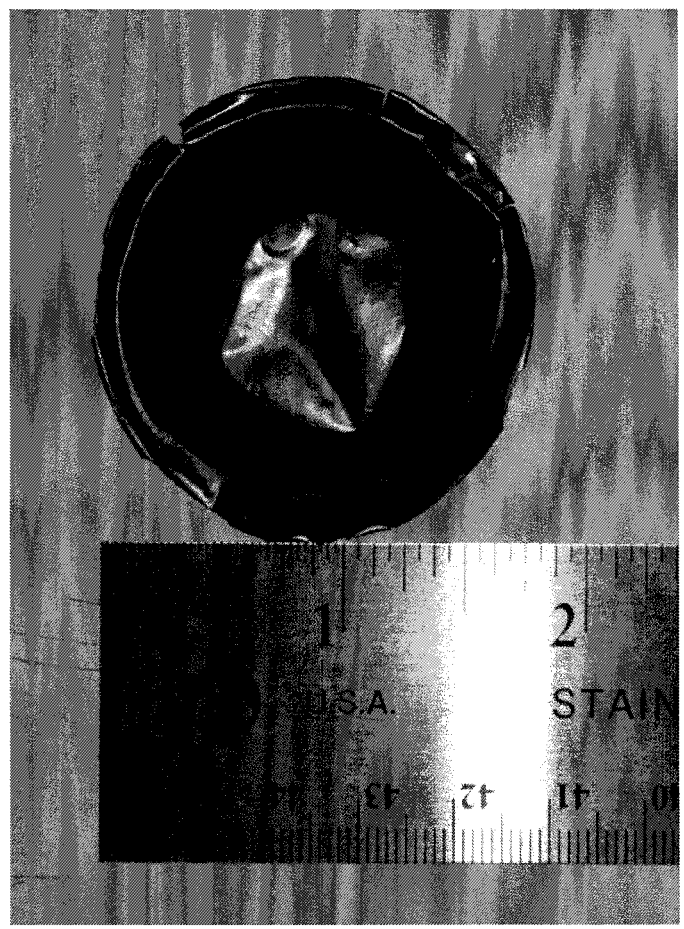
FIG. 6 is an optical image of a cohesive assembly comprising single-walled carbon nanotubes (SWCNTs) prepared according to Example 6.

The cohesive assembly thus obtained was in the form of a thin wafer comprising SWCNTs and residual bromine, which did not adhere to the flask. The wafer was shiny and reflective on the surface facing the flask (FIG. 6), and matte black on the surface facing away from the flask. The wafer had good mechanical strength and integrity. The estimated elastic modulus was about 350 MPa as determined by a flexural test.

The wafer was about 85 μm thick as determined by a digital micrometer, and had an effective carbon packing density of 0.50 g/cm³.

Example 7

Large Cohesive Flexible Film Assembly of SWCNTs

A cohesive flexible film of CNTs having a diameter of 9.0 cm was formed from single-walled carbon nanotubes (SWCNTs).

About 120 mg of Thomas Swan Elicarb SW SWCNTs were placed into a 50 ml round bottom flask and a magnetic stir bar added. Twenty ml of bromine were then added to the flask to completely cover the SWCNTs. The mixture of SWCNTs and bromine was then stirred magnetically for 24 hr at room temperature. The mixture was then transferred to a Teflon centrifuge tube (50 ml capacity) with a flexible copper sheath wrapped around it and sonicated for 10 minutes. After sonication, the SWCNTs were uniformly dispersed in the bromine.

The mixture was then transferred to a Petri dish with about 64 cm² bottom surface area (about 9 cm in diameter) and the bromine slowly evaporated over one hour in a similar manner as in Example 4.

Figure 7:
FIG. 7 is an optical image of a large (9.0 cm in diameter) cohesive assembly comprising SWCNTs prepared according to Example 7.

The cohesive assembly thus obtained was in the form of a circular wafer having a diameter of about 9.0 cm and a thickness of about 125 μm, comprising SWCNTs and residual bromine, which did not adhere to the flask. The wafer was shiny and reflective on the surface facing the flask (FIG. 7), and matte black on the top side, and had good mechanical strength and integrity.

Example 8

Cohesive Assembly of SWCNTs Dispersed in Iodine

A cohesive assembly of CNTs was formed from single-walled carbon nanotubes (SWCNTs). The SWCNTs were obtained from Carbon Solutions, Inc. (Riverside, Calif.), as product number P2-SWNT.

About 20 mg of SWCNTs were placed in a 50 ml, 3-neck flask, and heated at 150° C. for 20 min under vacuum to remove volatile species. The flask was then cooled to room temperature. A screw addition funnel was attached to the flask, and a magnetic stir bar was added to the flask.

Ten grams of iodine ($I_2$, 99.99+%, Sigma Aldrich Company, catalog number 326143) were added to the addition funnel, and then added to the flask containing the SWCNTs. The flask was evacuated quickly, to remove air, and the vacuum turned off. The flask was then insulated with glass wool, and heated to 150° C. to melt the iodine. The mixture was stirred using a magnetic stirrer for 3 hr at 150° C., then cooled to 100° C., and the flask was evacuated. Iodine was removed by evaporation while maintaining the pressure of the vessel between about 0.5 Torr and 1.0 Torr for 1 hr, after which the flask was cooled to room temperature.

Additional free iodine was removed by washing the contents of the flask with absolute ethanol, until no purple color remained in the wash solvent.

The product obtained was a cohesive assembly of SWCNTs in the form of a thin wafer. The product was removed from the flask by briefly rinsing it with dilute hydrofluoric acid.

Example 9

Cohesive Assembly of Expanded Graphite

A cohesive assembly in the form of a film was prepared from expanded graphite, following the procedure of Example 3. Instead of DWCNTs, 50 mg of expanded graphite (Chuetsu Graphite Works, Osaka, Japan, product number BSP 80AK) were used.

Figure 8:
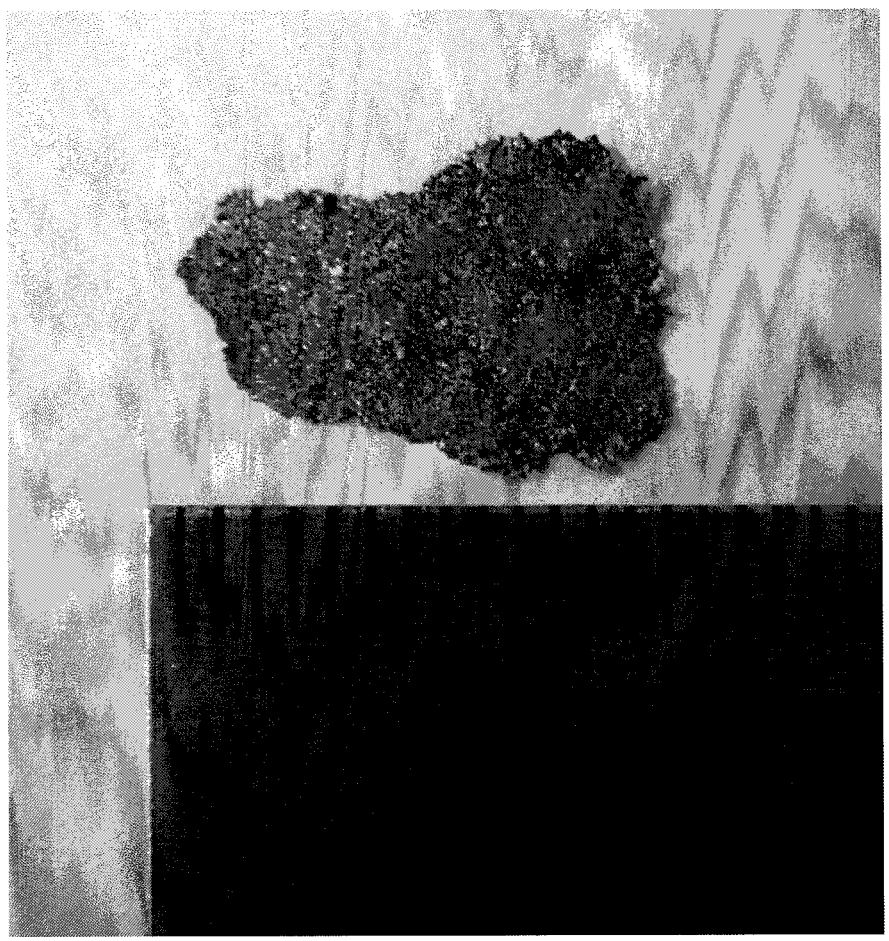
FIG. 8 is an optical image of a piece of a cohesive assembly comprising expanded graphite prepared according to Example 9.

The cohesive assembly thus obtained was in the form of a thin wafer, comprising graphite and residual bromine. The wafer had a rough surface texture (FIG. 8).

Example 10

Resistivity Measurement of Cohesive Carbon Assembly

Cohesive assemblies of carbon prepared according to Examples 1, 2, 3, 5, and 6 are measured for resistivity at a temperature of 300K as follows:

A rectangular film sample at least 4 mm in length and at least 3 mm in width is removed from the assembly by cutting with a scissor or sharp blade. The sample is mounted on a sample mount, and two gold electrical contact pairs (two current-carrying and two voltage-sensing) are directly compressed to the sample, in a standard Kelvin-type (4-point) probe configuration. The dimensions of the film between the gold electrodes are 3.67 mm in length and 2.42 mm in width, as determined by optical microscopy and metrology software.

A lead test is performed to ensure good contact between the sample and the test apparatus. Then, the sample is placed in a test chamber, which is then sealed and evacuated for 1 hr. The chamber is allowed to stabilize at 300K for 10 minutes. Resistance is then determined from the slope of the current-voltage (I-V) line at currents between 1 μA and 10 μA, in steps of 0.5 μA. The geometry of the sample and the resistance value are used to calculate the film's resistivity using the formula $$\rho = R\frac{A}{L}$$

where ρ is the resistivity in Ω-cm, R is the resistance in Ω, A is the cross sectional area of the film in cm², and L is the length of the sample in cm.

Resistivity of cohesive carbon assemblies prepared according to Examples 1, 2, 3, 5, and 6 are shown in Table 1. In general, resistivity increases with increasing thickness of the assembly film. Also, DWCNT-based films showed somewhat lower resistivity than SWCNT-based films.

TABLE 1

Resistivity of cohesive carbon assemblies.

| Example | Type of Carbon Assembly | Film Thickness (μm) | Resistivity at 300 K (Ω-cm) |
| --- | --- | --- | --- |
| 1 | DWCNT | 45 | $4.2 \times 10^{-3}$ |
| 2 | DWCNT | 4.0 | $2.7 \times 10^{-4}$ |
| 3 | DWCNT | 120 | $7.3 \times 10^{-3}$ |
| 5 | SWCNT | 40 | $2.6 \times 10^{-3}$ |
| 6 | SWCNT | 85 | $6.5 \times 10^{-2}$ |

Example 11

Temperature-Dependent Resistivity Measurement of DWCNT Assembly

A cohesive assembly comprising DWCNTs prepared according to Example 2 is measured for resistivity as a function of temperature.

A sample is prepared and mounted, and contact pairs are attached to the sample as described in Example 10.

A lead test is performed at room temperature to ensure good contact between the sample and the test apparatus. Then, the sample is placed in the test chamber, which is then sealed and evacuated for 1 hr. The chamber is allowed to stabilize at the starting temperature of 300K for 10 minutes. Resistance is then determined between 300K and 100K, at intervals of 20K, with a stabilization period of 4 minutes between each temperature. Resistance and resistivity at each temperature are determined as described in Example 10.

Figure 9:
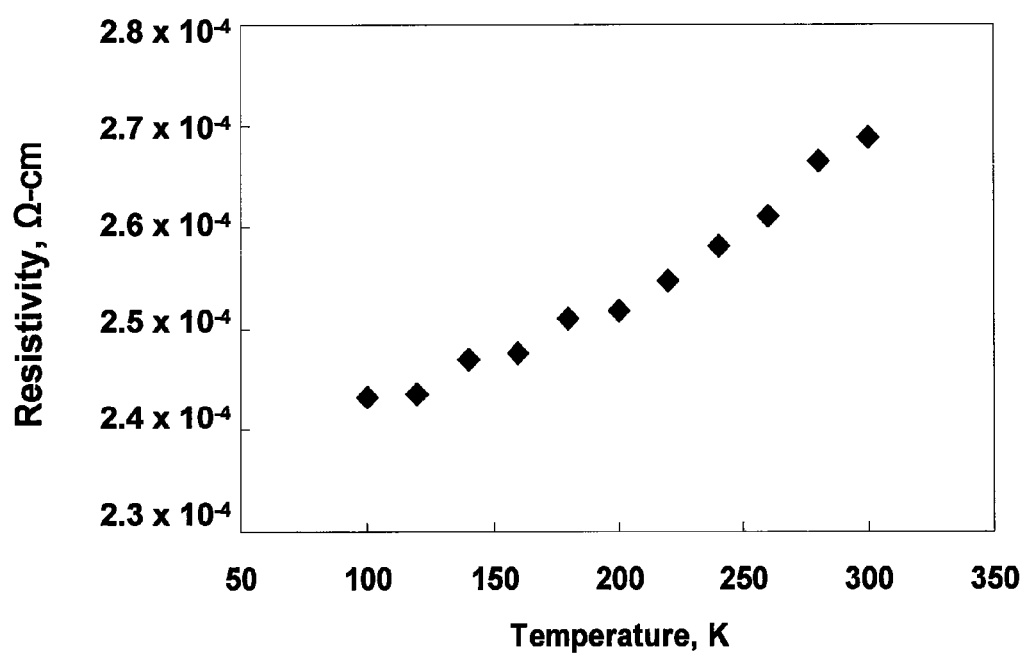
FIG. 9 is a chart showing the resistivity of a cohesive assembly comprising DWCNTs prepared according to Example 2, at temperatures between 300K and 100K, at intervals of 20K, measured according to Example 11.

The resistivity of the film at intervals of 20K between 300K and 100K is shown in FIG. 9. The decrease in resistivity as temperature decreases indicates the film assembly has strong metallic electrical character. Film resistivity decreases from $2.7 \times 10^{-4}$ Ω-cm at 300K to about $2.4 \times 10^{-4}$ Ω-cm at 100K.

Although several embodiments of the invention have been described in the Examples given above, those of ordinary skill in the art will appreciate that various modifications can be made without departing from the scope of the invention. Accordingly, other embodiments are within the scope of the following claims.

What is claimed:

1. A method for preparing a cohesive assembly comprising carbon, comprising the steps of:
   obtaining carbon in the form of powder, particles, flakes, or loose agglomerates,
   dispersing the carbon in a liquid comprising a liquid halogen, wherein the carbon and the liquid halogen have a ratio of between 5 and 20 milligrams of carbon per milliliter of liquid halogen,
   substantially removing the liquid halogen, and
   allowing the dispersed carbon to self-assemble into a monolithic cohesive assembly of the carbon having a distinct shape and size.

2. The method of claim 1, wherein the carbon comprises carbon nanotubes, graphite, expanded graphite, amorphous carbon, or a combination thereof.

3. The method of claim 1, wherein the carbon comprises carbon nanotubes.

4. The method of claim 3, wherein the carbon nanotubes comprise single-walled carbon nanotubes, double-walled carbon nanotubes, multi-walled carbon nanotubes, or a combination thereof.

5. The method of claim 1, wherein the halogen is chlorine, bromine, iodine, an interhalogen compound, or a combination thereof.

6. The method of claim 5, wherein the halogen is bromine or iodine.

7. The method of claim 1, wherein the carbon is double-walled carbon nanotubes and the liquid halogen is bromine.

8. The method of claim 7, wherein the carbon and the liquid halogen have a ratio of between 8 and 15 mg of carbon per milliliter of bromine.

9. The method of claim 1, wherein the carbon is dispersed in the liquid halogen by mechanical mixing, sonication, microfluidization, or a combination thereof.

10. The method of claim 9, wherein the carbon comprising double-walled carbon nanotubes is dispersed in the liquid halogen by mechanical mixing.

11. The method of claim 9, wherein the carbon comprising single-walled carbon nanotubes is dispersed in the liquid halogen by mechanical mixing followed by sonication.

12. The method of claim 1, wherein the carbon is dispersed in the liquid halogen containing a surfactant less than 1% (w/w) relative to the carbon.

13. The method of claim 1, wherein the liquid halogen is substantially removed by evaporation.

14. The method of claim 13, wherein the evaporation occurs at a pressure between 0.01 and 760 Torr.

15. The method of claim 13, wherein the liquid halogen is heated between about 20° C. and about 180° C.

16. The method of claim 1, further comprising heating the cohesive assembly formed to remove residual halogen that is chemically or physically bonded to the carbon of the assembly.

17. The method of claim 1, wherein the cohesive assembly has a carbon packing density of at least 0.5 g/cm$^3$.

18. The method of claim 17, wherein the cohesive assembly has a carbon packing density of at least 1.0 g/cm$^3$.

19. The method of claim 1, wherein the cohesive assembly has electrical resistivity lower than $10^{-1}$ Ω-cm.

20. The method of claim 1, wherein the carbon is DWCNT or expanded graphite.

* * * * *